(12) United States Patent
Pierson, Jr.

(10) Patent No.: US 6,621,833 B1
(45) Date of Patent: Sep. 16, 2003

(54) METHOD AND SYSTEM FOR EFFICIENTLY PASSING THE SILENCE OR UNUSED STATUS OF A DS0 CHANNEL THROUGH A DS0 SWITCH MATRIX AND A DATA SWITCH

(75) Inventor: Forrest L. Pierson, Jr., Dallas, TX (US)

(73) Assignee: World Com, Inc., Ashburn, VA (US)

( * ) Notice: Subject to any disclaimer, the term of this patent is extended or adjusted under 35 U.S.C. 154(b) by 0 days.

(21) Appl. No.: 09/464,786

(22) Filed: Dec. 17, 1999

(51) Int. Cl.[7] .............................. H04J 3/12; H04J 3/24; H04J 3/18; H04L 12/28
(52) U.S. Cl. .................. 370/528; 370/395.61; 370/473; 370/477
(58) Field of Search ................................ 370/521, 472, 370/473, 474, 470, 471, 475, 476, 477, 395.1, 396, 314, 435, 433, 432, 437, 395.61, 400, 350, 527, 528, 529

(56) References Cited

U.S. PATENT DOCUMENTS

| 5,570,361 | A | * | 10/1996 | Norizuki et al. | 370/528 |
| 6,038,231 | A | * | 3/2000 | Dolby et al. | 370/477 |
| 6,144,658 | A | * | 11/2000 | Lebizay et al. | 370/352 |
| 6,504,840 | B1 | * | 1/2003 | Bostrom et al. | 370/470 |
| 6,529,512 | B1 | * | 3/2003 | Galand et al. | 370/400 |

* cited by examiner

Primary Examiner—Kwang Bin Yao
Assistant Examiner—Hanh Nguyen (57) ABSTRACT

A method and system for improving the passage of silent or unused status of Ds0 channel to a data switch with a Ds0 switching capacity. The method allows the Ds0 channel source to be the only equipment that must engage a digital signal processor to remove silent and unused Ds0 channels from a Ds0 channel carrying data packet. The method provides for the Ds0 channel source, the intermediate nodes (data switches with Ds0 switching matrixes included) and Ds0 channel destination to recognize a simple and efficient means of passing suppression status of a Ds0 channel through the entire network.

27 Claims, 5 Drawing Sheets

| Header Address VCI=X | 1 2 3 4 5 6 7 8 9 1 1 1 1 1 1 6 | 1 1 1 1 1 1 1 1 1 1 2 3 4 5 6 | 1 2 3 4 5 6 7 8 9 1 1 1 1 1 1 6 | 1 1 1 1 1 1 1 1 1 1 2 3 4 5 6 |

Figure 4(b)

| Header Address VCI=X+1 | L L 1 2 4 5 7 9 1 1 1 1 1 1 0 1 4 5 6 | 1 2 4 5 7 9 1 1 1 1 1 1 N N 0 1 4 5 6 U U |

Figure 4(c)

| Header Address VCI=X+1 | L L 1 2 4 5 7 9 1 1 1 1 1 2 4 5 7 9 1 1 1 1 N 0 1 5 6 U |

Figure 4(d)

| Header Address VCI=X+1 | L L N N N N N N N N N N N N N N N N N N N N N N N N N N U U U U U U U U U U U U U U U U U U U U U U U U U U |

METHOD AND SYSTEM FOR EFFICIENTLY PASSING THE SILENCE OR UNUSED STATUS OF A DS0 CHANNEL THROUGH A DS0 SWITCH MATRIX AND A DATA SWITCH

BACKGROUND OF THE INVENTION a. Field of the Invention

The present invention relates generally to passing voice communications over a data communications network such as an asynchronous communications network or a synchronous communications network.

b. Background Information

Almost all customers of data traffic today have additional, separate links to carry voice. This is inefficient for the customer and the communications provider. Many are seeking techniques that place Ds0 channels in data packets for transmission over a data link, so that they can remove their voice links.

A communications network serves to transport information among a number of locations. The information is usually presented to the network in the form of time-domain electrical signals and can represent any combination of voice, video, or computer data. A typical communications network consists of various physical sites called "nodes," interconnected by conduits called "links." Each link carries information from one site to another site. End user sites may contain data terminating equipment (DTE) for combining, separating, and transforming data with or without voice. Network provider sites usually include either edge switches, with user network interfaces (UNI), or backbone switches, which only connect to other backbone switches and edge switches and do not contain UNI.

Voice information is carried via a Ds0 (or voice) channel that is a 64 kilobits per second (64 Kbps) channel and also the worldwide standard for digitizing voice conversation. The channel throughput is 64 Kbps because a digital data stream can adequately represent an analog voice signal if sampled at a rate of 8000 samples per second. If each voice sample is digitized using 8 bits, this results in a digital data stream of 64 Kbps. Since Ds0 is a synchronous TDM link, once a channel connection has been setup between two users, that channel is dedicated until the connection is torn (or brought) down, and cannot be used by anything or anybody else even if there is silence in the line.

Data currently is transmitted between nodes either as synchronous or asynchronous. In a synchronous network using Synchronous Transfer Mode (STM), each timeslot is assigned a certain time when it is to arrive at each node. The time when the timeslot arrives determines where the timeslot goes. Thus, the individual timeslots do not need to have routing information within them.

Asynchronous Transfer Mode (ATM), Frame Relay (FR), and Internet Protocol (IP), collectively called data, are considered asynchronous because each node in the network does not know until after a data packet arrives where it is intended to go. The arrival of a particular data packet at a node, on the other hand, is not guaranteed to occur at a particular point in time. Only by analyzing the routing information in the header can the data switch know where to route the data packet.

Asynchronous Transfer Mode is designed to be carried over the emerging fiber optical network, called the Synchronous Optical NETwork (SONET), although it can be carried over almost any communications link. The basic unit of ATM is a data packet called the ATM cell. Each cell contains two parts, a header, which contains routing information, and a payload, which contains the data to be transported from one end node to another. The ATM cell is always the same size.

Frame Relay and Internet Protocol are two other asynchronous types of communications protocols. Each is similar to ATM in that they also consist of a data packet. However, they differ from ATM in that their packet size can vary from packet to packet, and both can be considerably larger than ATM. This allows them to make more efficient use of the bandwidth of the communications media they travel over, but it makes receiving them more difficult in that packet size must be calculated for each packet. Both the FR protocol and IP may be used in point to point connections, but IP may also be used when multiple ports are connected to a single transmission medium.

Data can consume as much or as little as is needed for carrying actual traffic, because data does not reserve a fixed amount of bandwidth per link. While voice will never overload, or oversubscribe, the capacity of its links, there are mechanisms in place to handle data overloads when more is available than a physical link can carry. It is these mechanisms that allow data network designers to specify more data demand than capacity to carry, which is a process called statistical multiplexing.

Statistical multiplexing is the concept of giving multiple customers, in sum total, more bandwidth through a physical connection than it can carry. This is also known as over-subscribing. Studies have shown that customers will not always use all of the bandwidth their carrier has set aside for them. It is during this period of non-use by a customer that spare bandwidth is available for the over-subscription. If sufficient numbers of customers are placed on a single physical connection then large quantities of spare bandwidth can be realized.

When traffic is isolated among two or more physical connections, less statistical multiplexing can occur, as customers on one connection cannot use spare bandwidth on another. By joining all customers into a single, large connection, better statistical multiplexing occurs and the carrier is able to sell more bandwidth on one high-speed physical connection than on several smaller connections whose sum is equal to the one high-speed connection.

There are different ways of handling overloads in the data network. In ATM, the network is designed with large buffers, which absorb the excess traffic, queuing it up until capacity is available to place the traffic through the network. The traffic that is delivered out of its buffers first is determined by the quality of service (QOS) the customer has paid the carrier to provide. Higher QOS traffic is removed from its buffers before lower QOS. This is important for real time applications such as voice or interactive TV services, which must get through the network with a minimum amount of delay.

In those instances where so much excess traffic is delivered that the network cannot queue it up in buffers, the lower QOS traffic is deleted, or dropped, from the buffers to make room for higher QOS traffic to be queued up. Ideally, customer end-to-end protocols will detect this loss of traffic and will re-transmit the lost information.

An emerging standard in the IP network uses a different approach to handling overloads. In IP, there is no QOS as in ATM. Once a data packet is injected into the IP network, it will be given equal priority with all other traffic and delivered to its destination with a minimum of delay.

In an IP network, the traffic density in a link is closely monitored. As it begins to approach the link capacity, the IP data switch send congestion notices back towards the data sources telling them to slow down the amount of data they send. Each notice will, for a limited length of time, force the data source to restrict what it sends out. As link traffic gets closer and closer to link capacity, more of these messages are sent backwards. When an IP switch receives congestion notices and reduces the rate of transmission, it may experience congestion as well and will send congestion notices back to its sources.

Eventually, the notices reach the traffic origins, customers. The customer equipment must then cut back on what is sent into the network, and must decide which traffic it puts out has the highest priority so that it goes out while the lower priority traffic has to wait. Thus, the IP network passes the job of determining traffic priority to the customer. If a customer has a great deal of high priority traffic, it may pay a premium to not receive as many congestion notices when congestion hits the network as another customer may pay, so that it will get more guaranteed traffic during congestion.

The IP data switches also usually maintain small buffers, but these are designed exclusively to handle the small, temporary overloads that occur until the congestion notices are responded to and reduced traffic flows into the switch.

These two different means of determining traffic priority are given as an example only. Whatever the mechanism, voice will usually be given a higher priority than data. By ensuring that the voice traffic does not physically exceed the capacity of the network links, the network systems engineering team can ensure all voice gets through, squeezing out the needs of data traffic. This allows the physical links to stay at or close to capacity even as the demands of Ds0 change. This spreads the cost of the links out over more traffic, reducing the cost per data packet and thus making the network more efficient than dedicated links carrying voice can be.

Each of ATM, FR, and IP has certain benefits and certain disadvantages. By utilizing these protocols in areas where their benefits can be utilized to the maximum efficiency while minimizing the losses incurred from their disadvantages, a more efficient network is realized.

Because of its fixed size packet, ATM is more attractive on the higher speed links where it is considerably less expensive to design hardware to receive a fixed size packet than a variable sized packet. On the lower speed, but higher per-bit cost links, FR and IP are more attractive because of their line utilization efficiency. And at these speeds the cost difference between a port that can receive variable sized packets versus one that only has to receive fixed size packets is usually more than offset by the fact that there are no segmentation and reassembly functions that have to be performed. Segmentation and reassembly is needed when a variable sized message is placed in multiple data packets, which is necessary with ATM.

Improvements in the state of the art of design technology are making the segmentation and reassembly functions less expensive. On the other hands, similar improvements are making it easier to design IP and FR receivers that can operate at SONET rates. What will likely happen is that the industry will see ATM, which is maturer than IP, dominate the high-speed market for the next 5 to 10 years. After that time period, IP, which has a simpler and less expensive congestion management scheme than ATM, will become the dominant mechanism in high-speed traffic.

On a bit per bit basis, it is significantly less expensive to transmit data over fiber than using metallic links by several factors of ten. The theoretical capacity of fiber is in excess of 20 tera bits per second (20 million million bits per second). Current standards at 10 thousand million bits per second (gigabits per second, or gbps), and will soon increase to 40 thousand million bits per second. Furthermore, technology is also improving on the ability of a single fiber to carry numerous wavelengths, or colors. Each wavelength can carry 10 gbps independently of what the other wavelengths in the fiber are doing.

On the other hand, metallic links that can span long distances and are reasonable to manufacture have long ago reached their theoretical limits of roughly under 500 million bits per second. They are much bulkier than fiber optic links. The metallic link is also susceptible to rust and corrosion, whereas the fiber is relatively chemically inert.

A T1 link, which is an example of a metallic link, transmits one T1 frame 8000 times per second (or one frame every 125 $\mu$s). Each T1 frame contains a T1 payload with 24 Ds0 timeslots, one for each Ds0 channel with 8 bits in each timeslot. Each T1 frame also has a T1 frame bit that identifies the start of the T1 frame, so that a T1 frame has a total size of 193 bits. This results in a data stream of 1.544 Mbps (8000 frames/sec·193 bits/frame).

Repeaters, which re-amplify the signal, are needed to prevent signal attenuation (loss of signal strength as a signal travels down a link) on either type of link. Metallic links attenuate the signals more than do fiber links, so more repeaters for metallic links are needed than for fiber links for a given distance. For instance, a T1 link can span a maximum of just over one mile (6000 feet) before a repeater is needed; for T3, the range is under 1400 feet. It is not unusual for fiber optic links to span 50 to 100 miles between repeaters. Fiber also costs less per foot physically than metallic links do, and the connectors at each end of a fiber link are similar in price to the connectors of a metallic link. Given the longer span between repeaters, this translates into fewer connectors, and hence lower costs, for fiber.

While metallic interfaces on port cards and repeaters are less expensive than fiber interfaces, the cost difference does not justify the reduced number of repeaters in a fiber network, nor does it justify the more expensive cabling needs even inside a switching facility. Further, the limited range of T3 metallic links has impacted the designs of several switching facilities, whereas the range of fiber links does not factor into their design.

C. Related Art

There are a variety of existing algorithms for removing silent voice channels in data switches. The primary approaches to handling silent and/or unused channels involve the use of algorithms at each node.

These approaches require a digital signal processor to analyze Ds0 channels to determine if they are silent or unused. The digital signal processor can only handle a fraction of the Ds0 channels that pass through a port card, requiring multiple digital signal processors to handle all of the traffic on the port card. The digital signal processor also induces additional delay in the passage of traffic through the port card so it can analyze the energy content of the Ds0 signals to determine if it is silent or not.

However, not all algorithms may be recognized or supported by every data switch that contains a Ds0 switching function within it. Even when an algorithm is supported, the algorithm will usually require a large amount of processing capacity from a digital signal processor. Current technology can handle several hundred voice channels per digital signal processor. A typical port card with a 2.5 gbps capacity can carry in excess of 16,000 Ds0 channels. Assuming 250 voice channels per digital signal processor, it would take 64 digital signal processors to examine and process silence suppression for each voice channel. It is impractical to place this many digital signal processors on a port card and will remain so for many years. Even with improvements in processing speeds and capacity of digital signal processors on port cards, port speeds will increase by a factor of about four in the next two years, and a factor of about sixteen a few years after that. There will still need to be multiple digital signal processors on a port card, which is still inefficient and not practical because of space considerations, and costs.

Another problem with existing silence suppression techniques is that each technique requires a large sample of voice frames in order to determine if the voice signal is silent or not at each switch in the communications network. This large sample slows down the transition of the voice channel from one end of the network to another, increasing latency, or end to end delay, to where it is unacceptable.

Notwithstanding the usefulness of the above-described voice switching matrices and port cards, a need still exists for a method or a digital signal processor to remove unused or silent channels from a data transmission to lessen the traffic through a data network or communications network.

II. SUMMARY OF THE INVENTION

Using a data network to pass Ds0 channels from source to destination enhances the efficiency of the carrier network in that a single network for voice, video and computer data can be used. Ds0 channels in general, and voice carried in Ds0 channels in particular, can have unused but active channels groomed out of being carried in the network. The network still recognizes the connection, and substitutes a predetermined pattern for each suppressed channel. Usually, this pattern is a zero energy level pattern for the particular traffic, or an idle code of some form. The removal of unused Ds0 channels, not just the substitution of zero energy level pattern, increases the bandwidth available for other packets, increasing network efficiency and reducing the costs to the users by allowing more users than what would occur if the Ds0 channels consumed a constant amount of traffic in the network.

Furthermore, in the cases of carriers of Ds0 services such as regional Bell operating companies, the size, or number, or both of the network interface trunks to class V telephone switches can be reduced. Network interface trunks carry the traffic from the network to the switch that will provide end user services in the form of Ds0 channels such as a class V telephone switch. Present state of the art requires that traffic coming into a class V switch have multiple incoming trunks, whose overall capacity exceeds the capacity of the Ds0 switching matrix of the switch, because not every channel on the incoming trunks will be carrying active traffic. Implementing this invention allows a class V switch to have trunks coming to it whose capacity is smaller than what the switching matrix can handle, because a two-way conversation will be silent in one direction nearly half the time, and will thus be suppressed and not consuming bandwidth on the trunk.

Furthermore, many virtual connections to other class V switches, and to toll switches (class IV switches) can be established, but not consume bandwidth unless an actual Ds0 use takes place. These connections will, if all were active, consume more capacity than the switch has. However, only a fraction will be active at any time. By pre-establishing these virtual connections the class V switch can save on the processing time needed to establish this part of a connection, increasing its call processing capabilities.

The actual number of virtual connections to each of the other switches it communicates with can be the maximum number it historically has ever had from those switches and/or whatever number the systems engineers devise that will ever be the theoretical number of connections that can be in use between the two switches.

The communications service provider also achieves an advantage in that it does not have to manage two separate networks to the customer, but only one network. This reduces the operational cost of the provider.

An objective of the invention is to increase efficiency that can be achieved in carrying voice over data switches by removing unused channels and silent channels from Ds0 carrying data packets.

Another objective of the invention is to allow virtual connections to exist between edge switches and/or customer premise equipment such that a connection will not need to be created for a new telephone call.

A further objective of the invention is to reduce the number of networks connected to customers and managed by communications service providers.

A further advantage is that the communications service provider reduces the operational cost of managing communications networks and thus of providing communication services to customers.

Another advantage of the invention is that the data packets are smaller or, in the case of fixed sized data packets, more frames are placed in each data packet by removing unused channels and silent channels from Ds0 carrying data packets. Regardless of whether the data packets are fixed or variable sized, they may carry one or more frames of Ds0 channels within them. For example, ATM has forty-eight bytes of user data in each packet. If there is only one frame of Ds0 channels being carried then up to forty-eight channels can be carried. If there are two frames, up to twenty-four Ds0 channels can be carried per frame. A variable sized packet may carry one or more frames as well, because these packets do not have a limitation of forty-eight bytes.

Another advantage of the invention is that when one or more channels become active again, the receiving node can center the incoming Ds0 channels in a receive elastic store buffer.

Another advantage of the invention is a simplification of the communications network by providing virtual connections between edge switches and/or customer premises equipment, and thus reducing the importance of or potentially the need for a SS7 network to route telephone calls. A benefit of this simplification will be reduced setup time for making a connection between edge switches and/or customer premise equipment.

As a natural consequence of implementing this invention, the network receives an additional benefit of being able to reduce frame slips. Each intermediate node, as well as the end user, is able to re-center its elastic store buffer when all channels in a data packet are suppressed to reduce the chances of a frame slip occurring when they go active again.

Further features and advantages of the present invention, as well as the structure and operation of various embodiments of the present invention, are described in detail below with reference to the accompanying drawings.

III. BRIEF DESCRIPTION OF THE INVENTION

The present invention is described with reference to the accompanying drawings.

V. DETAIL DESCRIPTION OF THE INVENTION

FIGS. 1–5(e) illustrate the preferred embodiment of the invention as a method and an apparatus. The preferred method is for the network nodes to use a common flag system for indicating suppression of Ds0 channels because of silence or nonuse by the source node (or originating node) 100. The switches located at the intermediate nodes 140 will disassemble and reassemble the Ds0 carrying data packets in such a way to preserve the suppression status of each frame of the respective Ds0 channel.

Figure 1:
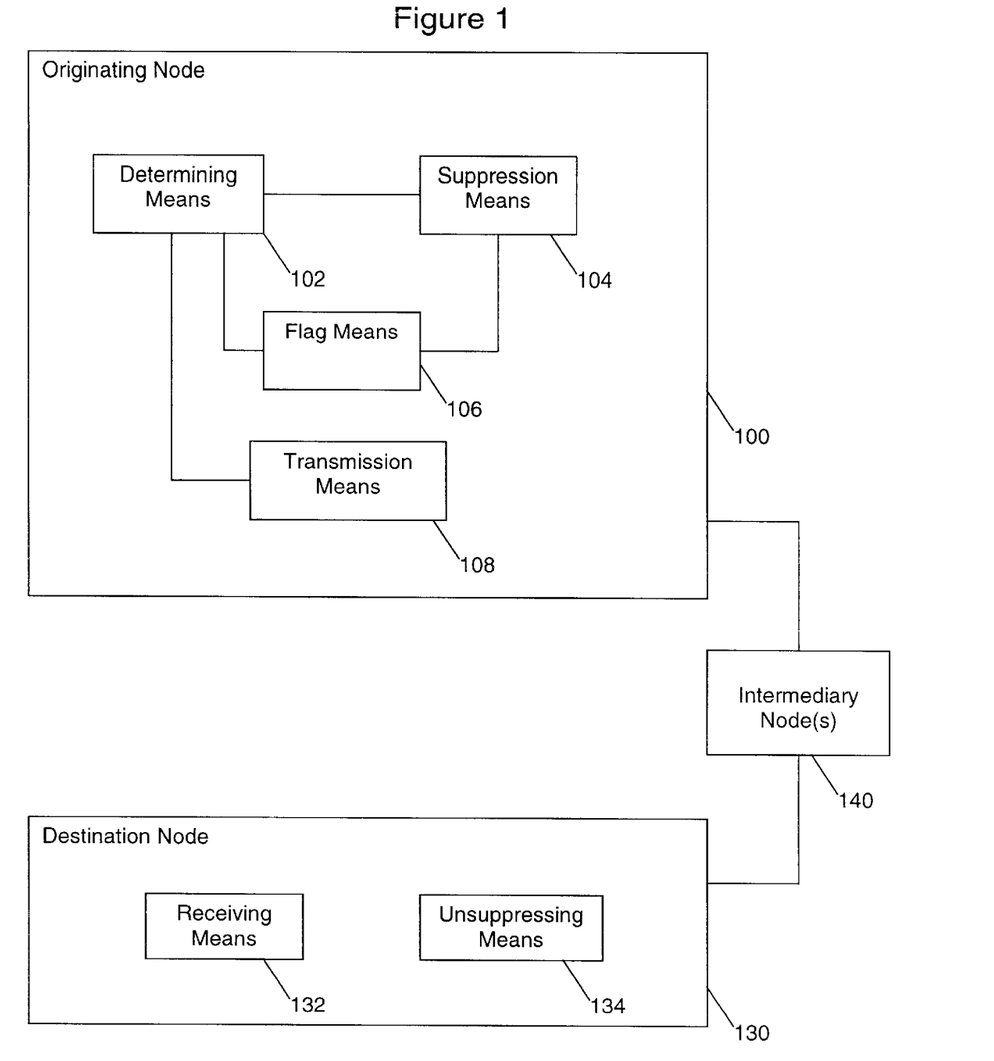
FIG. 1 illustrates a block diagram of the invention.

Preferably, upon establishment of the common flag system, the switches at existing network nodes will be upgraded using software and/or hardware to recognize and utilize the common flag system. As new network nodes are established, their respective switches will include the common flag system as software and/or hardware. FIG. 1 illustrates a functional block diagram of the relationships of the functional pieces 102, 104, 106, 108, 132, 134 for a preferred way of performing the method. The hardware may include circuit boards and/or integrated chips. The hardware preferably is either part of the control card or each port card attached to the node. The software may be resident at a particular switch, for example, in non-volatile memory, RAM, code that can be downloaded from a server, and/or mass storage devices.

The invention, as illustrated in FIG. 1, preferably will have the user network interfaces at the two respective ends of a communication (originating and destination nodes 100, 130) agree, upon the initiation of a communication connection (i.e., during the setup of the communication using the various calls that occur), to recognize the common flag system. When a virtual connection is established between to respective ends, then the flag system will preferably be agreed to at that point, and not each time a new discrete transmission of data packets occurs over the connection.

The respective ends 100, 130 will usually be customer switches (customer premise equipment), because that is the point at which the communications network interacts with customers and/or users. Customer premise equipment may include equipment located at a business that connects directly into the communications network or a local telephone switch of regional or Baby Bell. The suppression may be also implemented as part of an edge switch, for example, in a case where the customer is unable to do so. Each end 100, 130 preferably communicates with the rest of the communications network through a port card 108, 132. Thus, the Ds0 channel source (or originating node) 100, which in most cases will be a user network interface, preferably will make the determination of the existence of silence and/or nonuse in a channel based on commonly used or proprietary suppression techniques and strategies. Consequently, the data network does not have to be aware of the silence suppression method.

Figure 2:
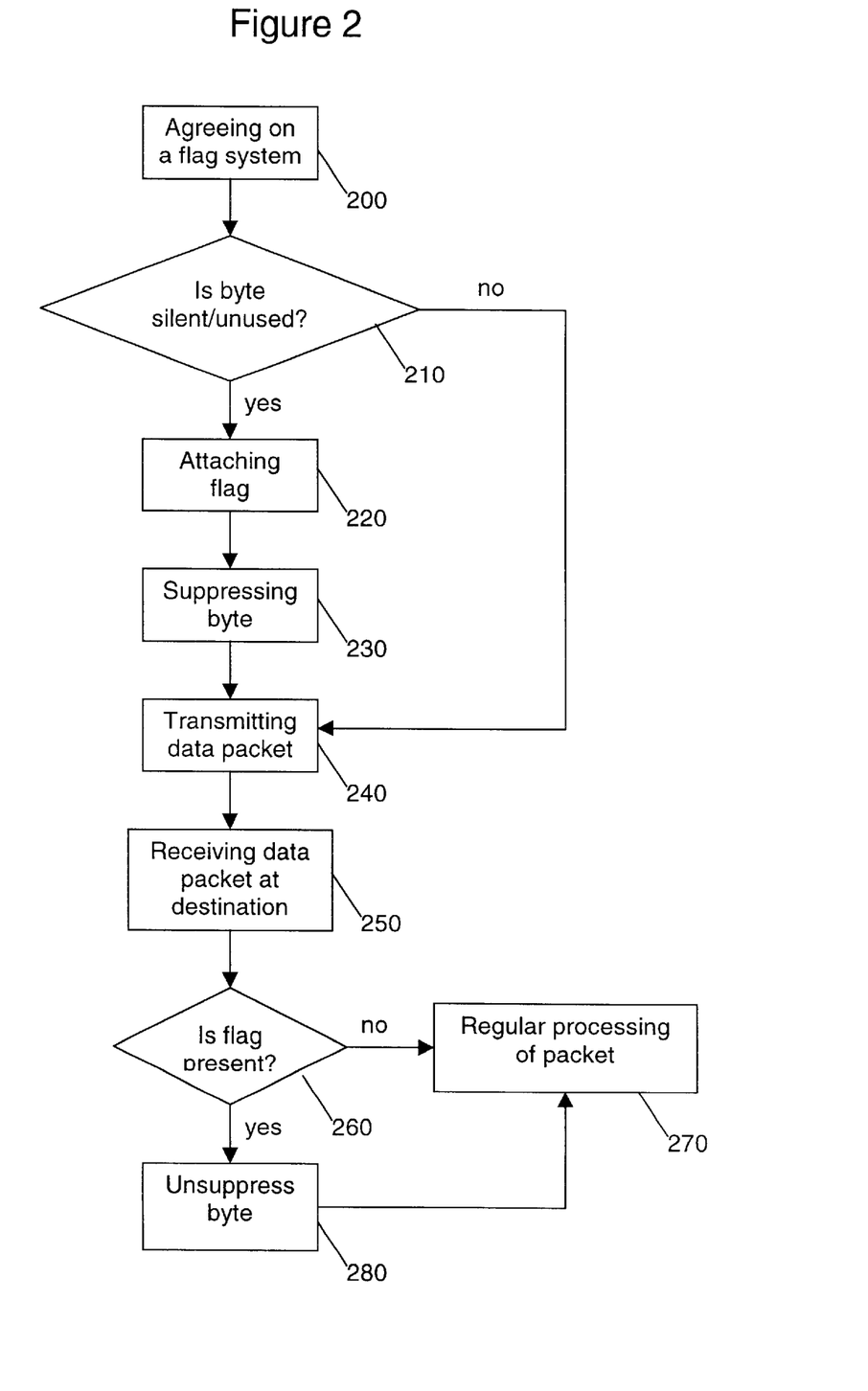
FIG. 2 depicts a flowchart of the invention.

The preferred method includes a series of steps shown, for example, in FIG. 2. As discussed above, preferably the first step upon establishing a connection is agreeing to a flag system, step 200. Upon receiving a byte at originating node 100, a determination is made as to whether the byte is silent and/or unused, 102, step 210. If the byte is neither, then preferably the next step is to include the byte in a data packet and transmit that data packet, step 240 via transmission means 108. An alternative to this is that a flag is assigned representing the byte is not silent as will be discussed later. If the byte is silent and/or unused, then a flag is assigned preferably to the data packet when the other bytes of that channel are silent for the next outgoing data packet, but this may also occur on a frame by frame basis, 106, step 220. The other step for a silent/unused byte is that the byte is suppressed, 104, step 230. These last two steps may be done in reverse order. The byte and/or flag is added to a data packet for transmission, 108, step 240.

The preferred method for receiving data packets at a destination node 130 is as follows. First, the data packet is received, 132, step 250. Second, a determination is made as to whether a flag is present and also, if needed, whether the flag represents at least one suppressed byte, 134, step 260. If no unsuppression is required, then normal handling of the data packet at the destination node occurs, step 270. Otherwise, the suppressed byte(s) are unsuppressed, step 280.

All that is necessary is that the end user and the data network adhere to the same standard for flagging suppressed channels, and that the data network be instructed as to what to substitute for the suppressed channel when it has to be extracted in a Ds0 switching matrix. By allowing intermediate nodes, for example backbone switches, 140 to identify suppressed channels through a simple flag and to substitute a unique pattern for the suppressed channels via a simple lookup mechanism, the intermediate nodes 140 will not need to have a digital signal processor to extract the silenced channels. Also, a digital signal processor is not needed to analyze channels that come out of a Ds0 switching matrix to determine if the channel can be suppressed or not, because the suppressed status stays with the channel. An example of an intermediate node, and also edge switches, is disclosed in a co-pending patent application, which lists Forrest L. Pierson, Jr. as inventor, entitled "Method and System for Implementing an Improved Ds0 switching Capability in a Data Switch" filed on Dec. 2, 1999, which is hereby incorporated by reference.

The flag allows the node to know upon receipt of the data packet whether or not the channel is suppressed, it does not need to delay sending the channel out so it can analyze numerous frames of the channel to determine if it can be suppressed. This eliminates the problem of creating too much latency in an interactive Ds0 channel such as voice.

Preferably, when the data packet is broken apart in a Ds0 switching matrix, the Ds0 switching matrix will substitute a unique pattern for suppressed Ds0 channel(s) as it and the flag passes through the Ds0 switching matrix. Preferably, the unique pattern will be predetermined to represent the channel that is being suppressed. Each unique pattern preferably will be determined when the Ds0 channel is established between the user network interfaces, and thus ideally can be different from other Ds0 channels that exist at the time of connection set-up. When a data packet is disassembled and then reassembled at a Ds0 switching matrix, the new data packets, which are assembled to be forwarded through an outgoing port to the next node, will include the flag. This will allow the suppressed channels to not be included in their respective data packet.

Alternatively in the data packet, the flag that is associated with the Ds0 channel can be unique for each frame of the Ds0 channel, or can represent the Ds0 channel for all frames. If a flag represents one Ds0 channel for one frame only, then packet organization is complicated by the fact that the random presence or absence of Ds0 channels as specified by each flag. The complication results from the flag location varying within the data packet, and thus, requiring additional mechanisms to located the flag within the data packet.

On the other hand, if the flag represents all frames of a Ds0 channel, then the data packet will provide for a more compact data packet. However, it adds some complications to re-assembling data packets as they leave a Ds0 switching matrix, because a suppressed channel preferably needs to be suppressed within each frame within the data packet. The complications preferably are dealt with as follows. First, when the data packet is received by a Ds0 switching matrix, the flag for that data packet will be duplicated for every frame and will thus be routed with each frame of the Ds0 channel. Second, during packet reassembly, a determination is made whether the flags for each respective frame of the Ds0 channel are the same. If the frames share a common flag, then a single copy of that flag for the Ds0 channel is placed in the data packet. Otherwise, the flag is set to the 'in use' status for all frames of the Ds0 channel in the data packet, and the respective substituted pattern for each of those frames that were suppressed is left in the data packet.

An alternative embodiment adds a flag to represent that the data packet contains suppressed channels. Preferably, a user definable flag is placed in the data packet header to inform a node of the existence of suppressed channels. Alternatively, this representation may be accomplished by using different addresses in the data packet header. Either alternative header will be routed identically by the data network. One address will instruct the node to check for silence suppression flags while the other address will inform the node that no flags are present.

This technique of identifying data packets with suppressed channels works extremely well with the fixed sized packets of ATM. ATM cells have a data packet size that lends itself extremely well to carrying whole multiples of frames of Ds0 channels only if the entire capacity of the payload could carry Ds0 channels without overhead. Unless one or more channels are suppressed to make room for the flags, putting flags in the payload with no suppressed channels will waste a portion of the packet.

For variable sized packets, if different header addresses are not an option and there are not user definable flags in the header, then the addition of another byte to determine if the flags exist will have a minor impact on the compactness of the data packet.

When the Ds0 switching matrix or the end user receives a packet without status flags, a flag indicating the active status for all channels is created within the voice switching portions of the data switch. This flag preferably is removed when the data packet leaves the voice switching portions of the data switch to avoid consuming additional bandwidth within the communications network.

Another alternative embodiment addresses the situation when all the channels in a data packet are suppressed, and it does not make sense to have to send multiple sequential copies of said packet into the network. This will especially be true of packets that carry inter-trunking channels between end users that carry large numbers of Ds0 channels as occur, for example, when virtual connections exist between two nodes. When a Ds0 carrying data packet has all Ds0 channels within it suppressed, the packets do not have to be repeatedly transmitted. Rather, after a packet with all Ds0 channels in it are suppressed is received, the receiving node, including the destination node, will realize that no further packets can be expected to be received from the packet source until one of the channels are re-activated. The receiving node will substitute the unique pattern for each Ds0 channel as specified above for all channels.

Figure 3:
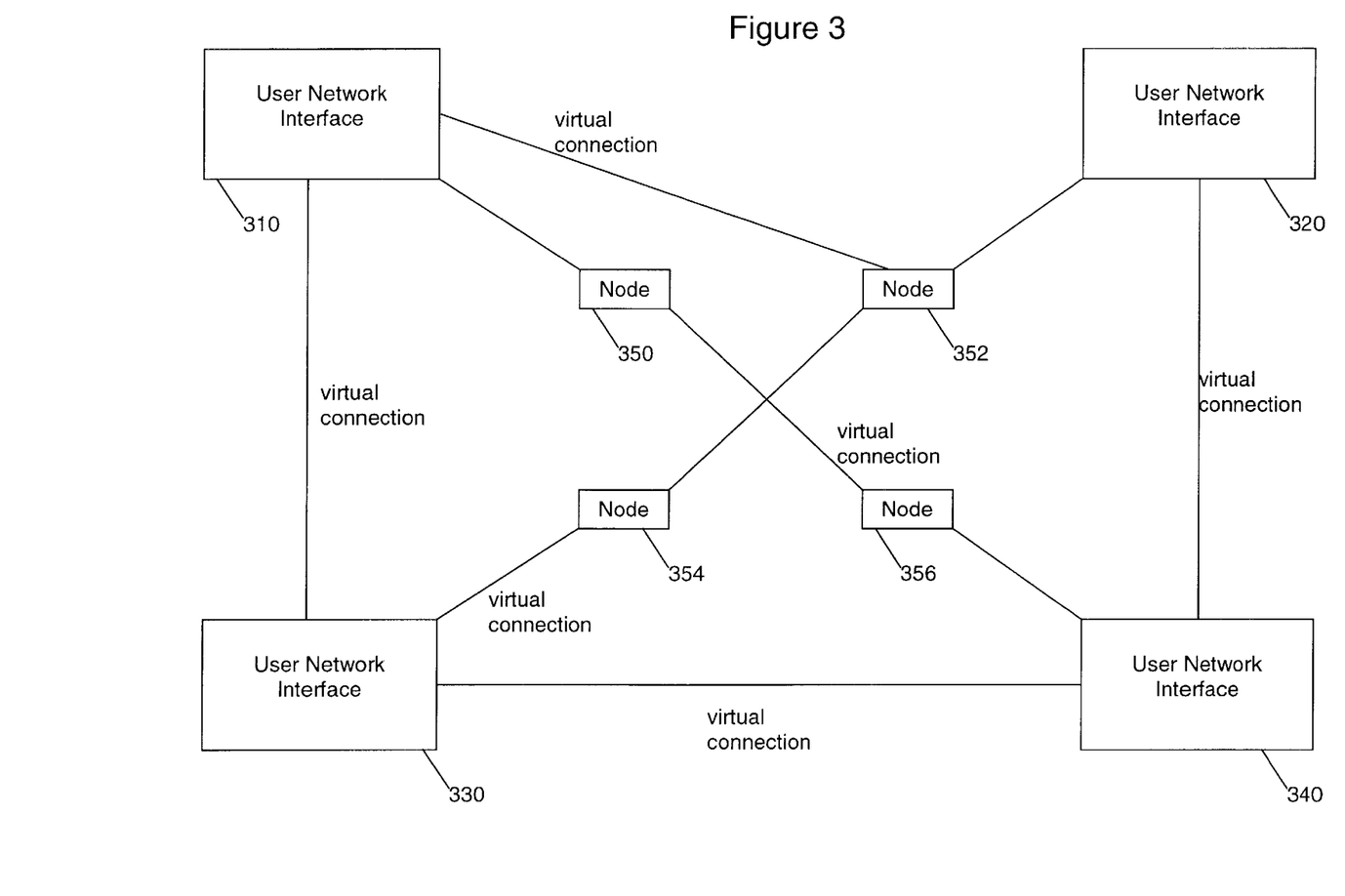
FIG. 3 illustrates a virtual connection network.
Figure 4A:
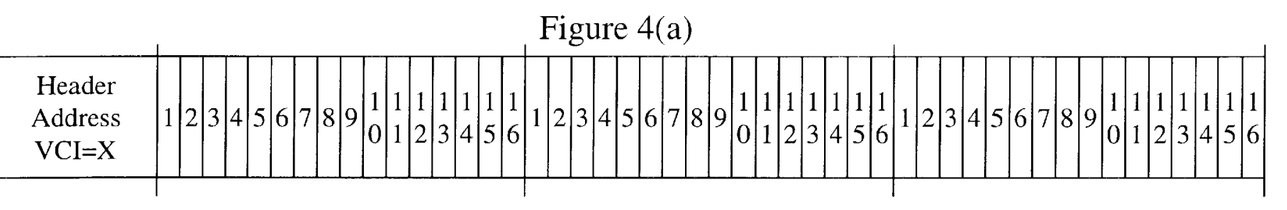
FIGS. 4(a)–(d) illustrates ATM cells produced pursuant to the invention.
Figure 4B:
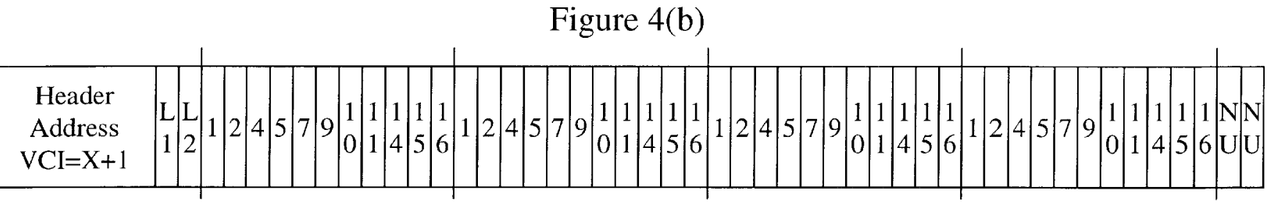
Figure 4C:
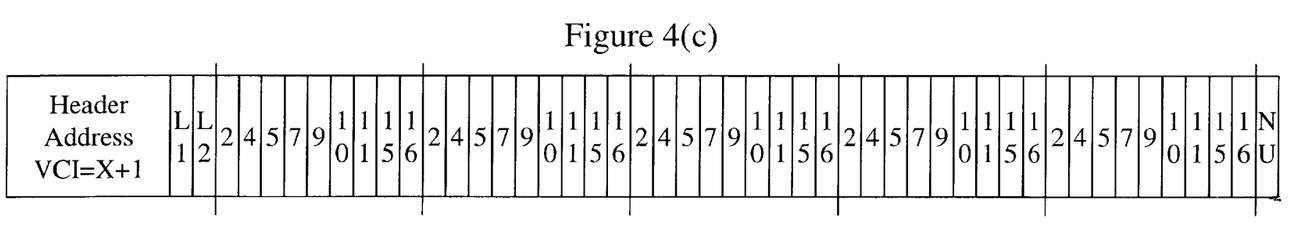
Figure 4D:
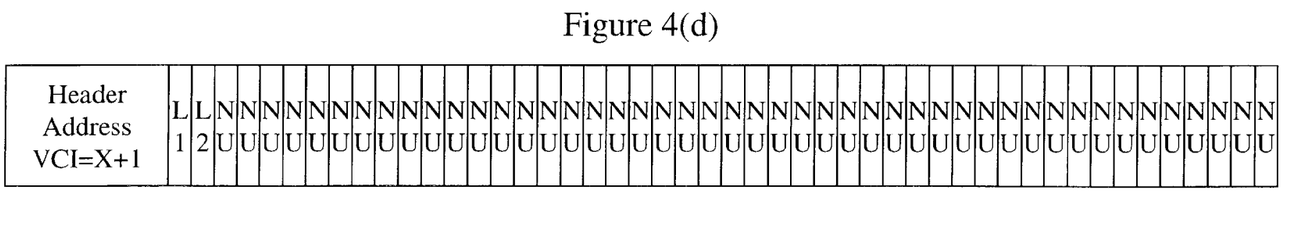
Figure 5A:
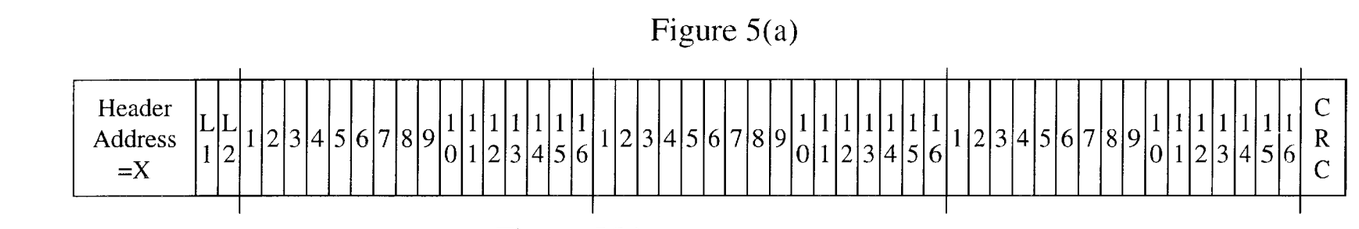
FIGS. 5(a)–(e) depicts frame relay packets produced pursuant to the invention.
Figure 5B:
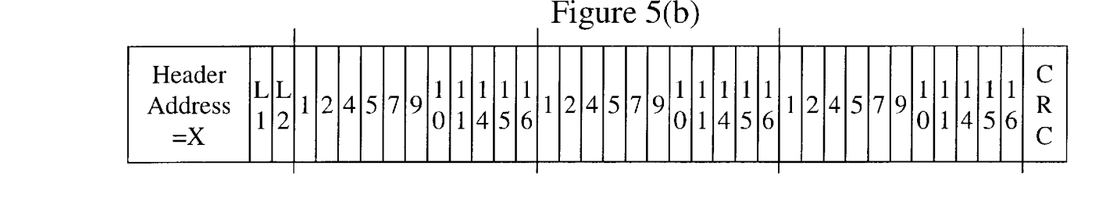
Figure 5C:
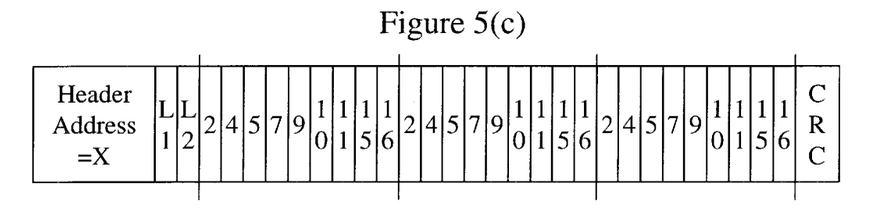
Figure 5D:
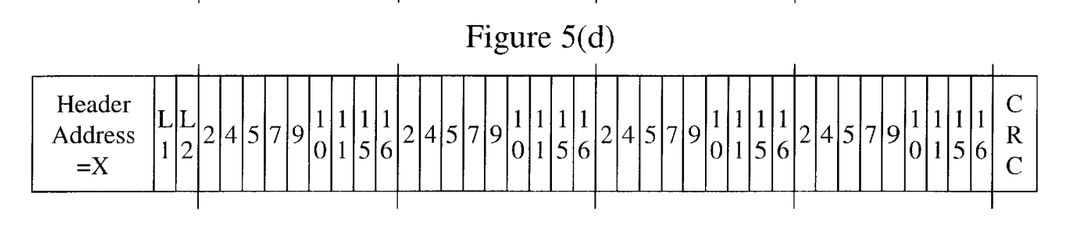
Figure 5E:
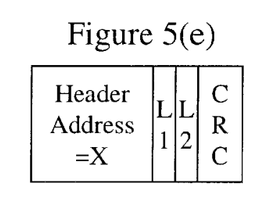

Initially, the originating node may transmit more than one such packet in case one gets lost in the network. Occasionally, the originating node may transmit another such packet of all suppressed channels just to inform the destination node that the virtual connections are still operational, just unused. The frequency of the pinging packet preferably is at a regular, predetermined frequency sufficient to maintain the virtual connection. An example of when this preferably will occur is when a virtual channel exists between two nodes, the originating node and the destination node as illustrated in FIG. 3, to notify the respective other node that the virtual connection should continue.

A benefit from this invention is that when one or more channels become active again, the receiving node can center the incoming Ds0 channels in a receiver elastic store buffer. An elastic store buffer is a buffer designed to smooth out jitter, or variations in receive rate, of incoming Ds0 channels. The worldwide rate of Ds0 channel transmission is once every 125 $\mu$s. Because of queuing and congestion delays in a network, the actual rate of reception of a Ds0 channel will vary. The elastic store buffer will absorb this variation by emptying out when the rate temporarily slows down, and by filling up as the rate speeds up. The output of the elastic store buffer will be fed at a constant 125 $\mu$s/frame rate into the Ds0 switching matrix.

When all channels are suppressed the receiving node will fill with the predetermined pattern, or allow emptying, the elastic store buffer to precisely the halfway point, and preferably keep it there. Once an active channel arrives, it is placed in the middle of the buffer. This re-centering of the buffer reduces the chances of a buffer underflow or overflow, which would result in a frame slip, which can cause popping in a voice conversation or disruption of the flow of traffic in a modem, fax, or data connection, or even loss of connection.

A frame slip is an event where incoming Ds0 channels are too much for the elastic store buffer to absorb, or incoming Ds0 channels are too few and the elastic store buffer empties out. When a frame slip occurs, the elastic store buffer will either drop a frame of Ds0 channels so it can empty out if full, or else duplicate a frame of Ds0 channels so it can fill up a little if empty.

FIG. 3 illustrates an example of the invention as a communications network having multiple virtual connections existing between use network interfaces 310, 320, 330, 340. The communications network depending upon distances between user network interfaces may also include intermediary nodes 350, 352, 354, 356. Each of the user network interfaces 310, 320, 330, 340 will preferably be connected by multiple virtual connections, which preferably are sufficient to handle all communication between two respective user network interfaces. The number of virtual connections entering any one user network interface may exceed the capacity of the user network interface, but because all the virtual connections will not be active at once there should be sufficient capacity to handle all communication involving that user network interface. An example of this is that each set of virtual connections entering user network interface 310 from the other three user network interfaces 320, 330, 340 may be 20,000 individual connections each even though user network interface 310 may only be able to handle 45,000 individual active connections.

FIGS. 4(*a*)–(*d*) illustrate ATM cells produced pursuant to the preferred method/apparatus of the invention. For exemplary purposes the ATM cells include 16 Ds0 channels per cell. When channels have been suppressed in these examples, other channels may replace the particular suppressed channels. Additionally, the L1 and L2 bytes, which carry the flags for the Ds0 channels being suppressed within the data packet, may be placed in other locations within the ATM cell. Preferably, the flag is one bit in size for each Ds0 channel. Thus, for each eight Ds0 channels, there preferably is one flag suppression byte. An example is when there are seventeen Ds0 channels per frame, then there will be three flag suppression bytes with preferably L1 and L2 each having eight flag suppression bits while L3 will have one flag suppression bit and seven empty bits. FIG. 4(*a*) illustrates an ATM cell with three voice frames per cell and no channels suppressed.

FIG. 4(*b*) provides for four voice frames per cell when there are five channels suppressed as exemplified by the exclusion of channels 3, 6, 8, 12, and 13. The header address changes to differentiate between no suppression and suppression as represented by VCI=X+1. L1 and L2 represent a sixteen bit field that identifies which of the sixteen channels are being suppressed. The two bytes labeled NU at the end of ATM cell represent unused bytes that exist, because the ATM cell is a fixed size cell.

FIG. 4(*c*) illustrates the form of an ATM cell with seven channels suppressed. The suppressed channels for this example are 1, 3, 6, 8, 12, 13, and 14. Once again L1 and L2 identify which of the sixteen channels are suppressed. This results in five voice frames per cell and one unused byte represented by NU.

FIG. 4(*d*) illustrates the form of an ATM cell with all of the channels suppressed. Once again L1 and L2 identify which of the sixteen channels are suppressed. This results in an indefinite number of voice frames per cell. The last forty-six bytes are unused as represented by the NUs.

FIGS. 5(*a*)–(*e*) depict the structure of frame relay packets with sixteen Ds0 channels per cell that might be produced using the preferred method. CRC represents cyclic redundancy check, which typically is two bytes long and is located at the end of the packet. As with the examples illustrated in FIGS. 4(*b*)–(*d*), L1 and L2 represent the bytes used to identify which of the sixteen channels are suppressed, if any, and may be located any where in the frame relay packet. FIG. 4(*a*) illustrates a frame relay packet with no channels are suppressed.

FIGS. 4(*b*)–(*e*) depict various numbers of channels being suppressed, which then reduces the overall size of the frame relay packet. FIG. 4(*b*) illustrates a frame relay packet with five channels being suppressed by removing channels 3, 6, 8, 12, and 13. FIG. 4(*c*) depicts a frame relay packet with seven channels being suppressed by removing channels 1, 3, 6, 8, 12, 13, and 14. FIG. 4(*d*) illustrates a frame relay packet in which the same seven channels as in FIG. 4(*c*) are suppressed, but adds a fourth voice frame in this frame relay packet. FIG. 4(*e*) depicts a frame relay packet with all of the channels being suppressed, which results in an indefinite number of voice frames per packet.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

I claim:

1. A method for transmitting information over a communications network having multiple switching nodes, said method comprising:

determining if a byte to be transmitted is silent, when the byte is silent attaching a flag to a packet that the byte would have been added to for transmission and suppressing the byte, transmitting the packet to another node, receiving the packet at a destination node, and unsuppressing the suppressed byte when the flag indicates suppression has occurred; and wherein each node in the communications network recognizes the flag representing a silent byte.

2. The method according to claim 1, further comprising attaching a flag to the packet prior to transmitting when the packet contains no suppressed bytes.

3. The method according to claim 1, further comprising agreeing to an unique identification for use as the flag during the initiation of a communication channel between an originating switch and the destination node.

4. The method according to claim 3, wherein determining the presence of the silent byte occurs only in the originating node, and all intermediate nodes within the communications network that disassemble and reassemble the packets will preserve the suppression status of every frame.

5. The method according to claim 1, wherein the step of determining the presence of a silent byte is performed by a digital signal processor located at the originating node in the communications network.

6. The method according to claim 1, further comprising:

separating the packet into channels, adding a flag to each channel when all of the channels in the packet are active, and forming at least one packet including at least one of the separated channels.

7. The method according to claim 1, wherein the flag is added to the header of the packet.

8. The method according to claim 1, wherein the flag is added to the packet payload of the packet.

9. The method according to claim 1, further comprising:

recognizing when the destination node receives a packet containing all suppressed channels, halting transmission of packets after sending the packet containing all suppressed bytes, maintaining the channel between the originating node and the destination node, pinging the destination node on a regular basis by the originating node while the bytes to be transmitted continue to be silent.

10. The method of claim 1, further comprising:

maintaining a elastic store buffer at each node in the communications network, and re-centering the elastic store buffer of a receiving node in the communications network when all channels in a packet are suppressed; and wherein the elastic store buffer smoothes out variations in the average arrival time of channels in received packets.

11. The method according to claim 1, wherein the bytes are for Ds0 channels.

12. The method according to claim 1, wherein the step of determining if a byte is silent is performed on a frame by frame basis for each packet.

13. A method for transmitting information over a communications network having multiple switching nodes, said method comprising:

determining if a byte to be transmitted is unused, when the byte is unused attaching a flag to a packet that the byte would have been added to for transmission and suppressing the byte transmitting the packet to another node, receiving the packet at a destination node, and unsuppressing the suppressed byte when the flag indicates suppression has occurred; and wherein each node in the communications network recognizes the flag representing an unused byte.

14. The method according to claim 13, further comprising attaching a flag to the packet prior to transmitting when the packet contains no suppressed bytes.

15. The method according to claim 13, further comprising agreeing to an unique identification for use as the flag during the initiation of a communication channel between an originating switch and the destination node.

16. The method according to claim 15, wherein determining the presence of the unused byte occurs only in the originating node, and all intermediate nodes within the communications network that disassemble and reassemble the packets will preserve the suppression status of every frame.

17. The method according to claim 13, wherein the step of determining the presence of an unused byte is performed by a digital signal processor located at the originating node in the communications network.

18. The method according to claim 13, further comprising:

separating the packet into channels, adding a flag to each channel when all of the channels in the packet are active, and forming at least one packet including at least one of the separated channels.

19. The method according to claim 13, wherein the flag is added to the header of the packet.

20. The method according to claim 13, wherein the flag is added to the packet payload of the packet.

21. The method according to claim 13, further comprising:

recognizing when the destination node receives a packet containing all suppressed channels, halting transmission of packets after sending the packet containing all suppressed bytes, maintaining the channel between the originating node and the destination node, pinging the destination node on a regular basis by the originating node while the bytes to be transmitted continue to be unused.

22. The method of claim 13, further comprising:

maintaining a elastic store buffer at each node in the communications network, and re-centering the elastic store buffer of a receiving node in the communications network when all channels in a packet are suppressed; and wherein the elastic store buffer smoothes out variations in the average arrival time of channels in received packets.

23. The method according to claim 13, wherein the bytes are for Ds0 channels.

24. The method according to claim 1, wherein the step of determining if a byte is silent is performed on a frame by frame basis for each packet.

25. A communications network comprising:

an origination node including means for determining if a byte to be transmitted is at least one of silent or unused, means for suppressing the respective byte when said determining means produces a true value, means for attaching a flag to a packet when at least one byte is suppressed, means for transmitting the packet, a destination node in communication with said originating node, said destination node including means for receiving the packet transmitted from said originating node, and means for unsuppressing the suppressed byte when the flag indicates suppression of a byte has occurred.

26. The communications network according to claim 25, further comprising at least one intermediary node located between said originating node and said destination node and in communication with said originating node and said destination node.

27. The communications network according to claim 25, wherein said transmitting means is a port card, and said receiving means is a port card.

\* \* \* \* \*